United States Patent [19]
Kamerman et al.

[11] Patent Number: 5,131,006
[45] Date of Patent: Jul. 14, 1992

[54] CARRIER DETECTION FOR A WIRELESS LOCAL AREA NETWORK

[75] Inventors: Adriaan Kamerman, Nieuwegein; Hans van Driest, Bilthoven, both of Netherlands

[73] Assignee: NCR Corporation, Dayton, Ohio

[21] Appl. No.: 633,568

[22] Filed: Dec. 24, 1990

[30] Foreign Application Priority Data

Sep. 6, 1990 [GB] United Kingdom ............... 9019487

[51] Int. Cl.⁵ .............................................. H04K 1/00
[52] U.S. Cl. .......................................... 375/1; 380/34; 375/108
[58] Field of Search .................. 370/18, 20, 60.1; 375/1, 38, 39, 107, 108, 110, 118; 455/59, 60, 61; 380/31, 33, 34, 40, 48

[56] References Cited

U.S. PATENT DOCUMENTS

| 4,995,052 | 2/1991 | Thorvaldsen | 375/1 |
| 5,031,191 | 7/1991 | Hiramatsu et al. | 375/1 |
| 5,038,362 | 8/1991 | Takeuchi et al. | 375/1 |

FOREIGN PATENT DOCUMENTS

| 0279080 | 12/1987 | European Pat. Off. | |
| 0286366 | 4/1988 | European Pat. Off. | |
| 0318665 | 9/1988 | European Pat. Off. | |
| 0343538 | 5/1989 | European Pat. Off. | |
| 0352787 | 7/1989 | European Pat. Off. | |
| 2203303 | 10/1988 | United Kingdom | 375/1 |
| 2211053 | 10/1988 | United Kingdom | |

OTHER PUBLICATIONS

"Design & Experimental results for Direct Sequence . . .", Kavehrad et al:, IEEE Jor On Selected Areas of Comm vol. SAC-5 No. 5, Jun. 1987, pp. 815-823.

Primary Examiner—Tod Swann
Attorney, Agent, or Firm—Elmer Wargo

[57] ABSTRACT

A local area network (10) utilizes a wireless transmission link and has network stations (12) each having two differently polarized antennas (14, 16). Data transmission utilizes a spread spectrum code and in the receiver, correlator outputs are utilized in an integrator and registers circuit (54) to provide correlator output sample values integrated over a plurality of symbol intervals. These values are stored in registers (156) the contents of which are utilized to determine a peak value and a total value which are applied to a spike quality determination circuit (78) including a look-up table (200). The resultant spike quality output value represents the quality of the received signal and is utilized for carrier detection and for antenna selection.

14 Claims, 6 Drawing Sheets

CARRIER DETECTION FOR A WIRELESS LOCAL AREA NETWORK

BACKGROUND OF THE INVENTION

This invention relates generally to local area networks (LANs), and more specifically, it relates to carrier detection for a wireless local area network.

Local area networks wherein a plurality of network stations are interconnected by cabling have become widely known and utilized. However, LANs using wired connections have the disadvantage that extensive cabling is required to interconnect the stations. The provision of such cabling is generally inconvenient, and gives rise to inflexibility if it is desired to alter the physical location of the stations. It has been proposed to utilize a wireless radio link for LANs. However, certain problems are associated with the use of a radio transmission link, particularly for LANs in an indoor environment. One such problem is multipath fading. The use of spread spectrum communication techniques alleviates the problems associated with multipath fading.

SUMMARY OF THE INVENTION

It is an object of the present invention to provide a local area network station employing spread spectrum coding for data transmission, wherein a fast and reliable carrier detection is achieved.

Therefore, in a preferred embodiment of the present invention, there is provided a local area network station for receiving data symbols encoded in a spread spectrum code and transmitted over a wireless channel, comprising:

an analog-to-digital conversion means to provide a digital representation of a received signal;

correlator means coupled to said analog-to-digital conversion means to provide a plurality of signal samples;

integrator and storage means including a plurality of storage registers to store value of integrated representations of said plurality of signal samples;

peak determining means to determine the maximum value stored in said plurality of storage registers;

total value determining means to determine the total value of the values stored in said plurality of storage registers;

spike quality determining means to provide a quality value signal representative of the quality of said received signal, with said quality being dependent upon said maximum value and said total value; and carrier detection means responsive to said quality value signal to provide a carrier detect signal.

In another aspect of the invention, in an apparatus for receiving a signal representing data symbols encoded in a spread spectrum code, and transmitted over a wireless communication channel, there is provided method for processing the received signal, including the steps of:

(a) converting the received signal to a digital representation;

(b) correlating said digital representation to provide a plurality of signal samples;

(c) averaging said signal samples;

(d) determining a peak value and a total value for the averaged signal samples; and (e) determining a spike quality value based on said peak value and said total value.

A feature of the preferred embodiment is that the carrier detect signal can be utilized to select an antenna in an antenna diversity system where two antennas are provided.

A preferred embodiment of the present invention will now be described by way of example, with reference to the accompanying description, claims, and drawing.

DETAILED DESCRIPTION OF THE INVENTION

Figure 1:
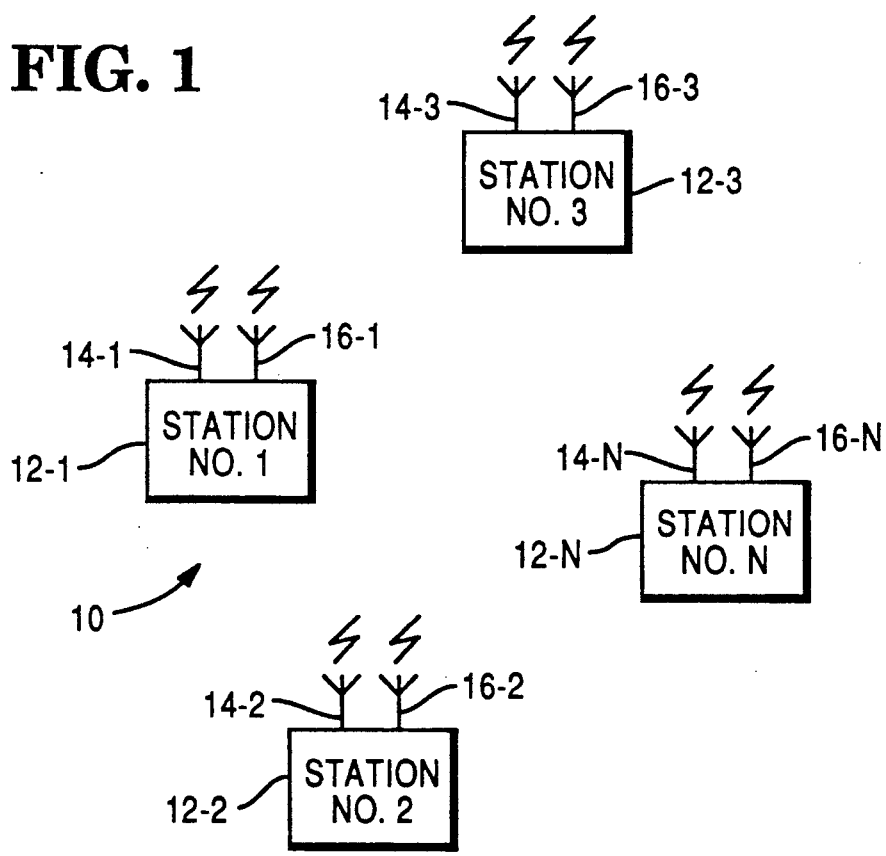
FIG. 1 is a diagram of a radio LAN.

Referring first to FIG. 1, there is shown a radio local area network (radio LAN) 10 including a plurality N of stations 12, shown individually as 12-1 to 12-N. Each station has two antennas 14 and 16, which are polarized in different directions such as at right angles to each other, and are shown individually as 14-1 to 14-N and 16-1 to 16-N.

Communication among the stations 12 takes place on a single radio channel, and uses spread spectrum communication technology. In the indoor radio LAN of the preferred embodiment, the 902-928 MHz band is utilized. Another suitable frequency band lies around 2.5 GHz.

Figure 2:
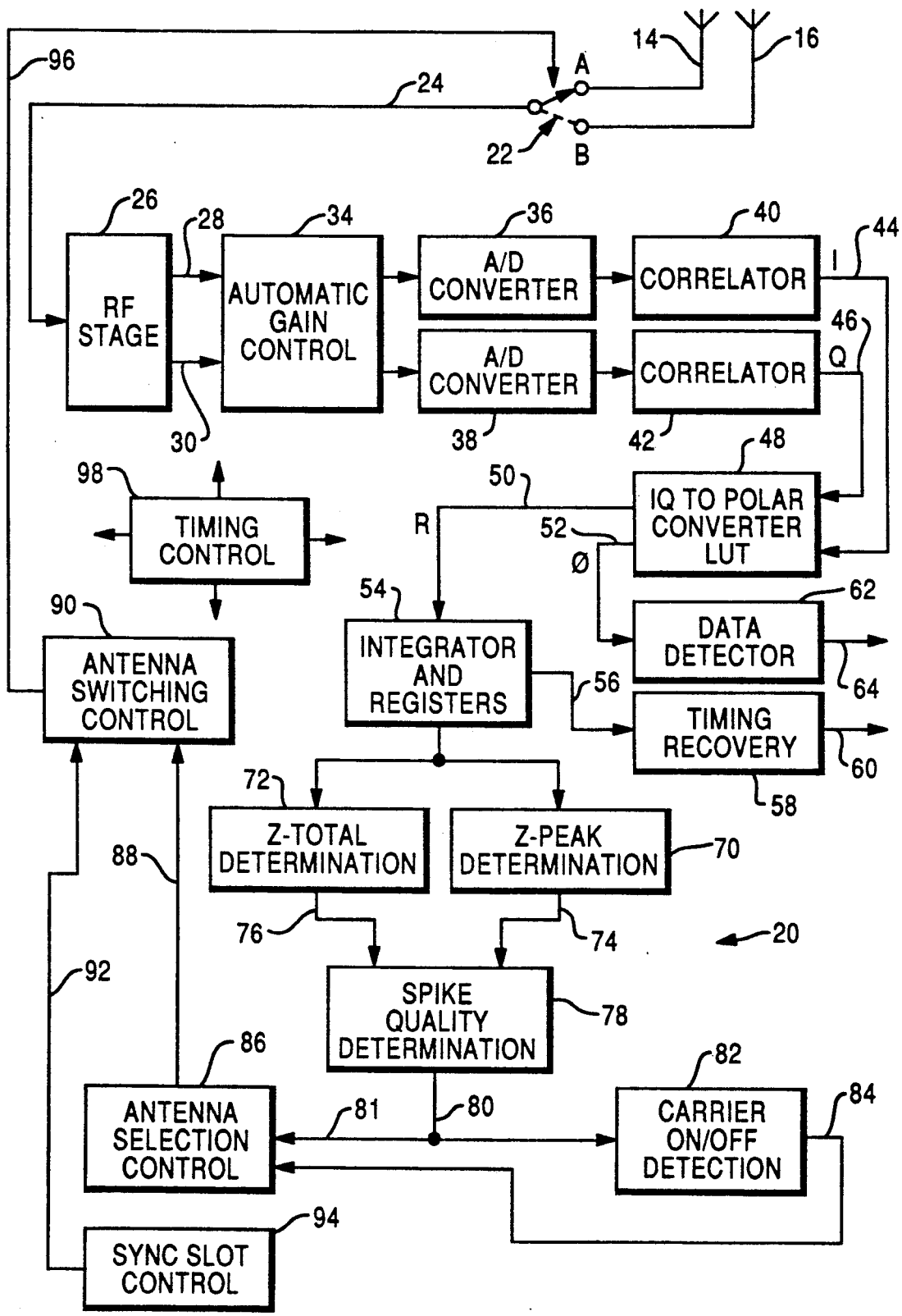
FIG. 2 is a block diagram of a portion of a transceiver section of a LAN network station.

Referring now to FIG. 2, there are shown pertinent blocks of a transceiver circuit 20 included in a typical station 12. It should be understood that the station 12 includes additional circuits (not shown) such as a LAN controller device, a memory and a CPU, which are conventional devices, and because they are not of relevance to the present invention, they will not be described herein. In the preferred embodiment, information is transmitted using an 11-chip spread spectrum code based on quadrature modulation with two bits per symbol and 4DPSK (4 phase differential phase shift keying) coding.

The signals from the antennas 14 and 16 are passed via a switch 22 to a line 24 connected to an RF stage 26 which includes a 90 degree phase shifter (not shown) and provides in-phase and quadrature signals on respective lines 28 and 30, which are coupled to an automatic gain control circuit (AGC) 34. Respective in-phase and quadrature outputs from the AGC 34 are applied to respective analog-to-digital converters 36, 38 which provide digital outputs to respective correlators 40 and 42. The correlators 40 and 42 (to be described) are adapted to correlate their respective input signals in accordance with the spread spectrum code utilized in the transmission, and provide corresponding in-phase and quadrature spike output waveforms on lines 44 and 46. It should be understood that in the preferred embodiment, an 11-chip spread spectrum code is utilized, and each chip is sampled twice, whereby there are 22 samples per symbol. With these parameters, the correlators 40 and 42 provide output spike waveforms having peaks after every 22 samples.

The in-phase and quadrature signals I and Q on the lines 44 and 46 are applied to an IQ to polar coordinate converter 48 which is implemented as a look-up table (LUT) and converts the in-phase and quadrature signals I and Q to polar signals R and $\phi$ on output lines 50 and 52, where R represents a vector length or amplitude (modulus) and $\phi$ represents a phase angle. The R signal on the line 50 is applied to an integrator and registers circuit 54 (to be described) which has an output 56 connected to a timing recovery circuit 58 which provides recovered timing signals on a line 60. The $\phi$ signal on the line 52 is applied to a data detector circuit 62 which provides recovered data signals on a line 64.

An output of the integrator and registers circuit 54, which includes a plurality of Z-registers, is applied to a Z-peak determination circuit 70 and a Z-total determination circuit 72, which operate, in a manner to be described, on the contents of the registers included in the circuit 54, to provide a Z-peak value on a line 74 and a Z-total value on a line 76. The lines 74 and 76 are connected to a spike quality determination circuit 78 (to be described), which provides a spike quality value signal on a line 80. The line 80 is connected to a carrier on/off detection circuit 82 which provides an output over a line 84 to an antenna selection control circuit 86. The line 80 is also connected directly to the antenna selection and control circuit 86 over a line 81. The antenna selection and control circuit 86 provides an output over a line 88 to an antenna switching control circuit 90, which also receives an input over a line 92 from a sync slot control circuit 94. The antenna switching control circuit 90 provides an output over a line 96 to control the operation of the switch 22.

The circuit 20 includes a timing control circuit 98 which provides appropriate timing signals, where required, to the blocks shown in the drawing. However, to avoid complications in the drawing, the individual connections from the timing control circuit 98 to the individual blocks are not shown in FIG. 2.

Figure 3:
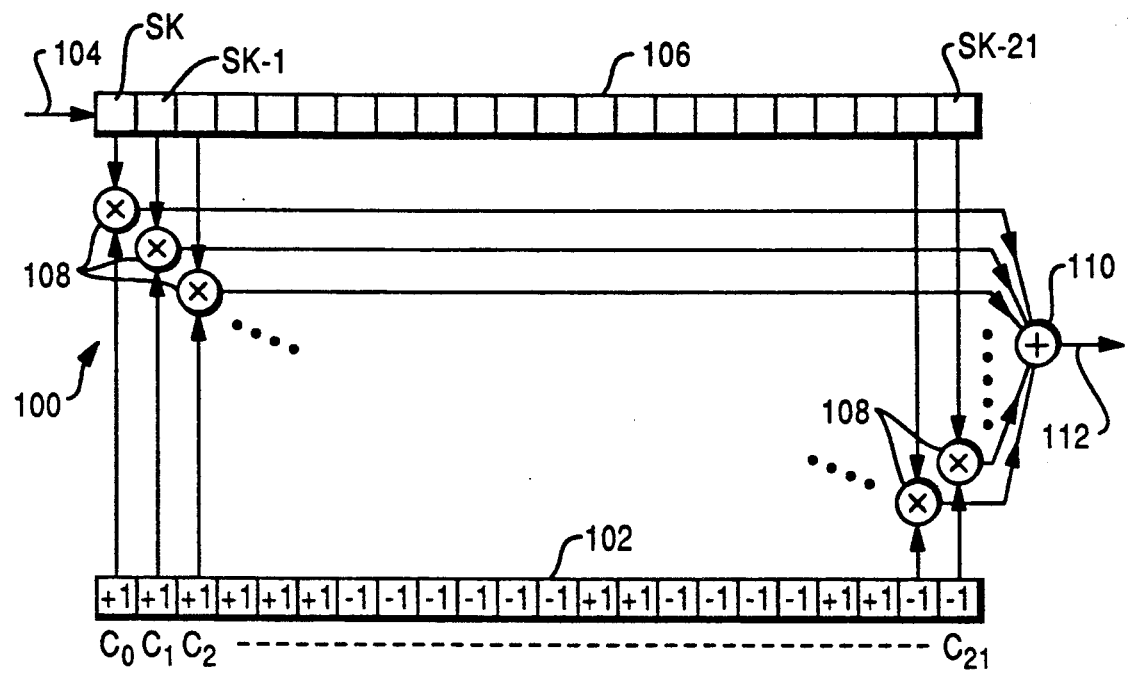
FIG. 3 is a first embodiment of a correlator which may be used in the circuitry shown in FIG. 2.

Referring now to FIG. 3, there is shown a first embodiment of a correlator 100 which may be utilized for the correlator 40 or 42 shown in FIG. 2. The correlator 100 is in the form of a finite impulse response (FIR) filter having coefficients $C_0, C_1, C_2, \ldots, C_{21}$, which have the values $+1$ or $-1$ stored as values in a register 102 It should be understood that the spreading code used for the spread spectrum code of length 11 utilized in the preferred embodiment is:

$$+1, +1, +1, -1, -1, -1, +1, -1, -1, +1, -1.$$

Since the preferred embodiment operates with oversampling factor of 2, the correlator has 22 coefficients, which have the values shown in the register 102.

The correlator input signal is applied over an input lead 104 to a 22-stage shift register 106, the stages of which successively store the input sample values $S_K$, $S_{K-1}, \ldots, S_{K-21}$. The outputs of the shift register stages, together with the corresponding coefficient values from the register 102 are applied to multipliers 108, the outputs of which are connected to an adder 110 which provides the correlation output signal on an output lead 112.

Figure 4:
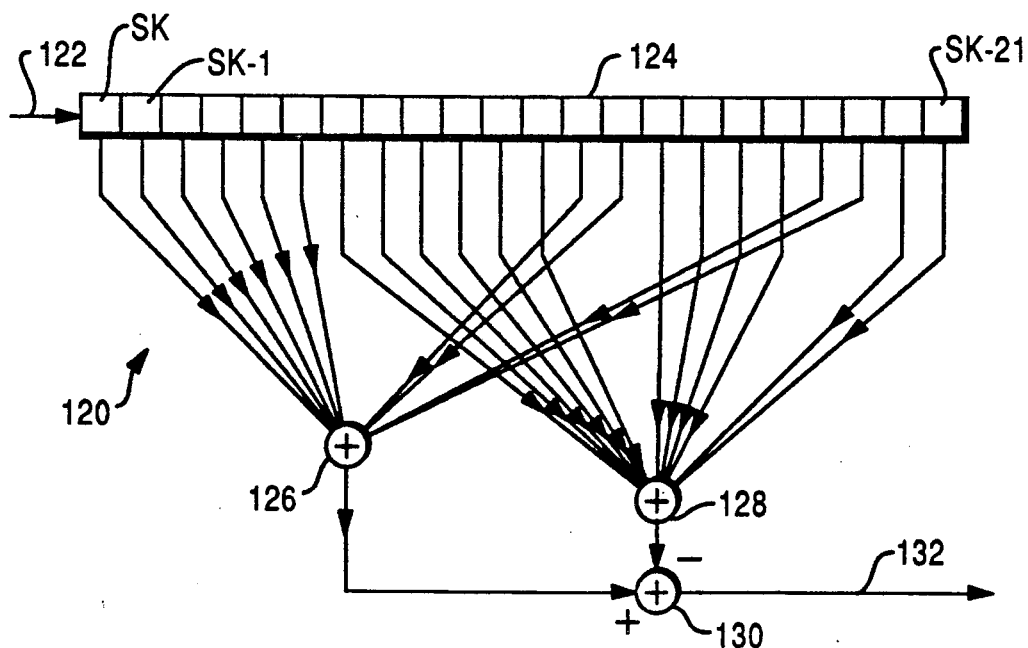
FIG. 4 is a second embodiment of a correlator which may be used in the circuitry shown in FIG. 2.

Referring to FIG. 4, there is shown an alternative embodiment of a correlator 120 which may be utilized for the correlator 40 or 42 shown in FIG. 2. The correlator 120 includes an input line 122 coupled to a shift register 124, the stages of which store successive sample values $S_K, S_{K-1}, \ldots, S_{K-21}$. The shift register stages are connected to an adder 126 or to an adder 128 according as the relevant coefficient value is $+1$ or $-1$. The outputs of the adders 126, 128 are connected as positive and negative, respectively, to an adder 130, which provides the correlator output signal on an output lead 132.

It will be appreciated that the $+1$ or $-1$ coefficient values used in the correlators shown in FIGS. 3 and 4 enable a simple implementation to be achieved.

Figure 5:
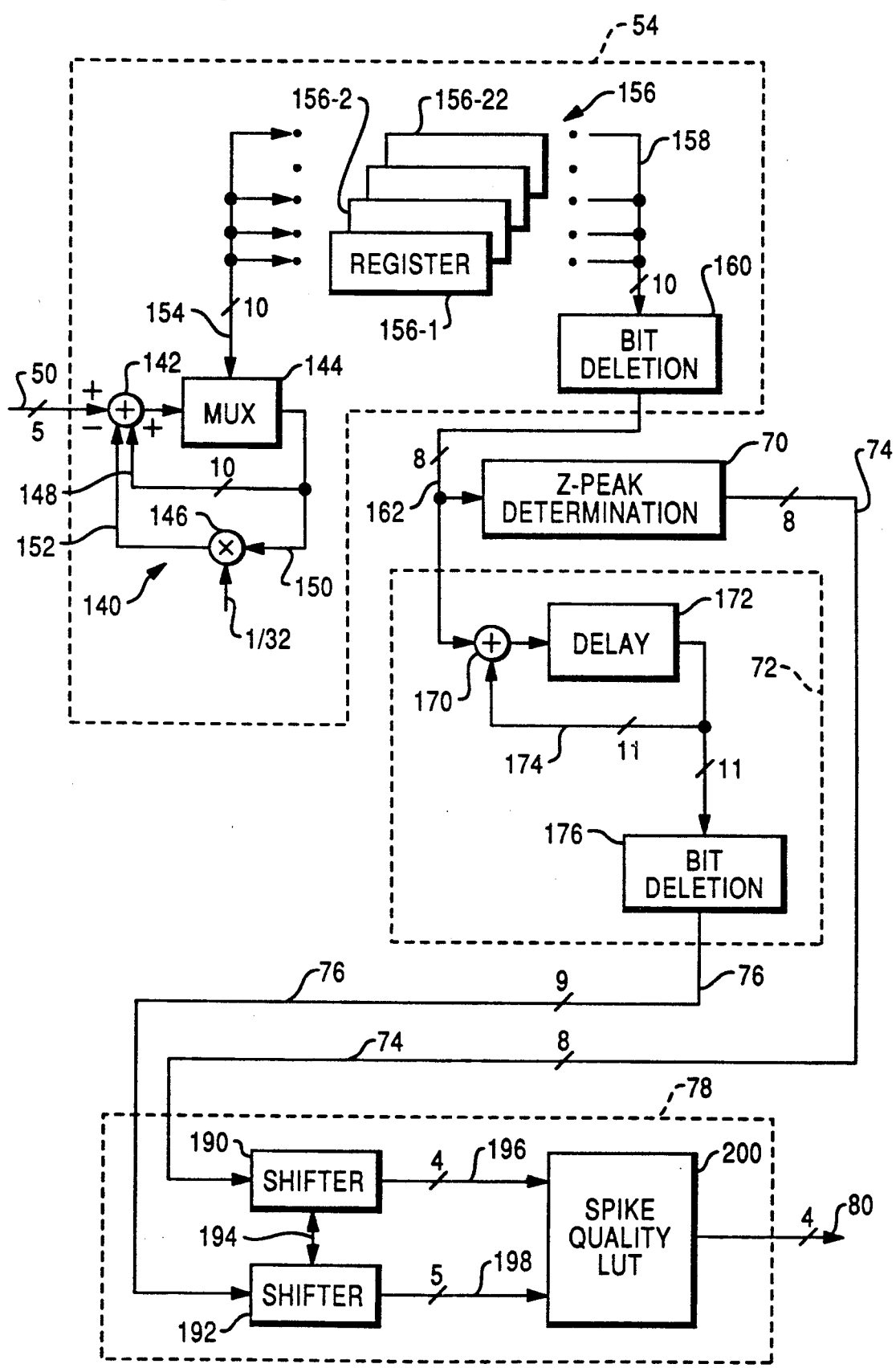
FIG. 5 is a detailed diagram of an integrator and registers block shown in FIG. 2.

Referring now to FIG. 5, there is shown a more detailed diagram of the integrator and registers circuit 54, and Z-peak and Z-total determination circuit 78, shown as blocks in FIG. 2. In connection with FIG. 5, it should be understood that the short transverse lines which cross certain of the interconnecting leads indicate the number of bit-carrying conductors in the associated leads.

The 5-bit input line 50 is connected to a leaky integrator circuit 140 which includes an adder 142, a delay circuit 144, and a multiplier 146. The output of the adder 142 is connected to the input of the multiplexer circuit 144, the output of which is coupled via a feedback line 148 to a positive input of the adder 142, and via a line 150 to the multiplier 146, which has a constant $1/32$ value applied thereto. The output of the adder 146 is connected over a line 152 to a negative input of the adder 142. The input line 50 is connected to a positive input of the adder 142. The multiplexer circuit 144 is also connected over a bidirectional 10-bit line 154 to a block of 22 registers 156, shown individually as registers 156-1 to 156-22. Outputs of the registers 156 are connected over a 10-bit line 158 to a bit deletion circuit 160, which deletes the two least significant bits and provides an 8-bit output on an 8-bit line 162. The manner of processing the multiplexer 144 and the registers 156-1 to 156-22 gives an effective delay of 22 sample intervals (one symbol period) between the adder 142 and lines 148 and 150. The multiplexer 144 is operated under the control of the timing control circuit 98 (FIG. 2).

The line 162 (FIG. 5) is connected to an input of the Z-peak determination circuit 70 and to an input of the Z-total determination circuit 72, which will now be described. The line 162 is connected to the input of an adder 170 which has an output connected to the input of a delay circuit 172, the output of which is connected via a feedback line 174 to a second input of the adder 170. The adder 170 operates only during 22 samples of the symbol on the line 162. The adder 170 effects summation, with overflow protection at a value of 2047, that is, the adder 170 has a maximum value of 2047. The output of the delay circuit 172 is also connected to a bit deletion circuit 176, which deletes the two least significant bits to provide a 9-bit output, the 9-bit output line 76 representing the Z-total value. The line 162 is also connected to the Z-peak determination circuit 70, which selects the maximum of the signals on the line 162 during 22 sample intervals (one symbol period).

The 8-bit line 74 (Z-peak value) and the 9-bit line 76 (Z-total value) are applied as inputs to the spike quality determination circuit 78. The 8-bit line 74 is connected to the input of a shifter circuit 190, and the 9-bit line 76 is connected to the input of a shifter circuit 192. The shifter circuits 190 and 192 are interconnected by a control line 194. The shifter circuits 190 and 192 effect multiplications by left shifting their contents and are arranged to operate such that they are shifted together by 0, 1, 2, 3 or 4 bit positions, until the most significant 1 bit in the Z-peak or Z-total value, as the case may be, is in the leftmost position. The 4-bit output of the shifter circuit 190 on the 4-bit line 196 and the 5-bit output of the shifter circuit 192 on the 5-bit line 198 are applied as address signals to address a spike quality look-up table (LUT) 200. The arrangement of the spike quality look-up table 200 is shown in Table 1. In Table 1, the horizontal values 0-15 represent Z-peak values, the vertical values 0-31 represent Z-total values and the table entries having values from 0 to 15 represent spike quality (SQ) values, with the value 15 representing the best spike quality and the value 0 representing the worst spike quality (no signal received).

periods. When a carrier signal is detected, the antenna switching control circuit 90 is further operative for a few antenna slot intervals, as will be explained hereinbelow, during which the FIG. 5 circuitry provides spike quality values for the respective states A and B, whereby whichever of state A and state B has the better determined spike quality is switched to or maintained during the reception of the received data frame. During transmission by the transceiver 20, the state A is always operative.

With the above in mind, the processing of the FIG. 5 circuitry will now be described. During the time that the antenna switching control circuit 90 causes alternate switching between states A and B, the FIG. 5 circuitry is controlled, under the timing control circuit 98 (FIG.

TABLE 1

| PEAK | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TOTAL | | | | | | | | | | | | | | | | |
| 31 | 0 | 0 | 0 | 0 | 0 | 0 | 0 | 0 | 0 | 0 | 0 | 0 | 1 | 2 | 4 | 7 |
| 30 | 0 | 0 | 0 | 0 | 0 | 0 | 0 | 0 | 0 | 0 | 0 | 0 | 1 | 3 | 6 | 7 |
| 29 | 0 | 0 | 0 | 0 | 0 | 0 | 0 | 0 | 0 | 0 | 0 | 1 | 2 | 4 | 7 | 8 |
| 28 | 0 | 0 | 0 | 0 | 0 | 0 | 0 | 0 | 0 | 0 | 0 | 1 | 3 | 5 | 7 | 8 |
| 27 | 0 | 0 | 0 | 0 | 0 | 0 | 0 | 0 | 0 | 0 | 0 | 2 | 4 | 6 | 8 | 9 |
| 26 | 0 | 0 | 0 | 0 | 0 | 0 | 0 | 0 | 0 | 0 | 1 | 2 | 5 | 7 | 9 | 10 |
| 25 | 0 | 0 | 0 | 0 | 0 | 0 | 0 | 0 | 0 | 0 | 1 | 3 | 6 | 7 | 10 | 10 |
| 24 | 0 | 0 | 0 | 0 | 0 | 0 | 0 | 0 | 0 | 0 | 2 | 4 | 7 | 8 | 10 | 11 |
| 23 | 0 | 0 | 0 | 0 | 0 | 0 | 0 | 0 | 0 | 1 | 2 | 5 | 8 | 9 | 11 | 11 |
| 22 | 0 | 0 | 0 | 0 | 0 | 0 | 0 | 0 | 0 | 1 | 3 | 6 | 9 | 10 | 12 | 12 |
| 21 | 0 | 0 | 0 | 0 | 0 | 0 | 0 | 0 | 1 | 2 | 4 | 7 | 9 | 10 | 12 | 13 |
| 20 | 0 | 0 | 0 | 0 | 0 | 0 | 0 | 0 | 1 | 3 | 5 | 8 | 10 | 11 | 13 | 14 |
| 19 | 0 | 0 | 0 | 0 | 0 | 0 | 0 | 0 | 2 | 4 | 6 | 9 | 11 | 12 | 13 | 14 |
| 18 | 0 | 0 | 0 | 0 | 0 | 0 | 0 | 1 | 2 | 5 | 7 | 9 | 11 | 12 | 14 | 14 |
| 17 | 0 | 0 | 0 | 0 | 0 | 0 | 0 | 1 | 3 | 6 | 8 | 10 | 12 | 13 | 14 | 14 |
| 16 | 0 | 0 | 0 | 0 | 0 | 0 | 0 | 2 | 4 | 7 | 9 | 11 | 13 | 14 | 14 | 14 |
| 15 | 0 | 0 | 0 | 0 | 0 | 0 | 1 | 2 | 5 | 8 | 10 | 12 | 13 | 14 | 14 | 15 |
| 14 | 0 | 0 | 0 | 0 | 0 | 0 | 1 | 3 | 6 | 9 | 11 | 13 | 14 | 14 | 15 | 15 |
| 13 | 0 | 0 | 0 | 0 | 0 | 0 | 2 | 3 | 7 | 10 | 12 | 13 | 14 | 15 | 15 | 15 |
| 12 | 0 | 0 | 0 | 0 | 0 | 0 | 2 | 4 | 9 | 11 | 13 | 14 | 14 | 15 | 15 | 15 |
| 11 | 0 | 0 | 0 | 0 | 0 | 1 | 3 | 5 | 10 | 12 | 14 | 14 | 15 | 15 | 15 | 15 |
| 10 | 0 | 0 | 0 | 0 | 0 | 1 | 3 | 6 | 12 | 14 | 14 | 15 | 15 | 15 | 15 | 15 |
| 9 | 0 | 0 | 0 | 0 | 0 | 2 | 4 | 7 | 14 | 14 | 15 | 15 | 15 | 15 | 15 | 15 |
| 8 | 0 | 0 | 0 | 0 | 1 | 2 | 5 | 8 | 14 | 15 | 15 | 15 | 15 | 15 | 15 | 15 |
| 7 | 0 | 0 | 0 | 0 | 1 | 3 | 6 | 9 | 15 | 15 | 15 | 15 | 15 | 15 | 15 | 15 |
| 6 | 0 | 0 | 0 | 0 | 2 | 3 | 7 | 10 | 15 | 15 | 15 | 15 | 15 | 15 | 15 | 15 |
| 5 | 0 | 0 | 0 | 1 | 2 | 4 | 8 | 12 | 15 | 15 | 15 | 15 | 15 | 15 | 15 | 15 |
| 4 | 0 | 0 | 1 | 1 | 3 | 5 | 9 | 13 | 15 | 15 | 15 | 15 | 15 | 15 | 15 | 15 |
| 3 | 0 | 0 | 1 | 2 | 3 | 6 | 10 | 15 | 15 | 15 | 15 | 15 | 15 | 15 | 15 | 15 |
| 2 | 0 | 0 | 2 | 3 | 4 | 7 | 11 | 15 | 15 | 15 | 15 | 15 | 15 | 15 | 15 | 15 |
| 1 | 0 | 1 | 2 | 3 | 5 | 8 | 13 | 15 | 15 | 15 | 15 | 15 | 15 | 15 | 15 | 15 |
| 0 | 0 | 1 | 3 | 4 | 6 | 9 | 15 | 15 | 15 | 15 | 15 | 15 | 15 | 15 | 15 | 15 |
| PEAK | 0 | 1 | 2 | 3 | 4 | 5 | 6 | 7 | 8 | 9 | 10 | 11 | 12 | 13 | 14 | 15 |

The 4-bit output of the spike quality look-up table 200, in accordance with Table 1, is applied over the 4-bit output line 80. It will be appreciated that a spike quality value of 15 indicates very good signal reception quality whereas a spike quality value of 0 indicates that no signal is received. An intermediate spike quality value indicates an intermediate signal quality reception condition.

The circuitry shown in FIG. 5 is operative only when the transceiver 20 is in the receive mode, and is processed partially per sample, which in the preferred embodiment is at a 22 MHz rate, and partially per symbol which, in the preferred embodiment, is at a 1 MHz rate. This receive mode processing starts after 36 symbol periods from the beginning of an antenna slot interval. It should be understood that when no carrier signal is detected by the transceiver 20, the antenna switching control circuit 90 (FIG. 2) causes the switch 22 to alternate between a state A slot interval (antenna 14 operative) and a state B slot interval (antenna 16 operative). Each antenna slot interval has a duration of 40 symbol periods (corresponding to 4×22=88 samples) of the slots, which, as mentioned, are each 40 symbol periods long. During these 4 symbol periods, which commence after the expiration of 36 symbol periods from the commencement of each antenna slot interval, the leaky integrator circuit 140 (FIG. 5) and the registers 156 are processed. This processing effects that successive samples R are added to the contents of the registers 156-1 to 156-22, respectively, to calculate the changing average of the rectified spike waveform. The leaky integrator circuit 140 adds the sample value R to $^{31}/_{32}$ times the previous register 156-2 value $Z_1$ and stores the new $Z_1$ value in the register 156-1; then adds the sample value $R_{k+1}$ to $^{31}/_{32}$ times the previous register 156-2 value $Z_2$ and stores the new $Z_2$ value in the register 156-2; and proceeds in this manner to successively process the remaining registers 156-3 to 156-22. After processing the register 156-22, the leaky integrator circuit 140 reverts to processing the register 156-1 again, and proceeds in this manner as long as it is operative. More precisely, during a period of 4 symbol intervals just before the end of the antenna slot, the correlator output samples are rectified (modulus value) and added to the contents of 22 registers 156 as follows:

---

The values of the 1st, 23rd, 45th, and 67th sample are added to Register 1.
The values of the 2nd, 24th, 46th, and 68th sample are added to Register 2.
The values of the 3rd, 25th, 47th, and 69th sample are added to Register 3.

.
.
.

The values of the 22nd, 44th, 66th, and 88th sample are added to Register 22.

---

Thus the contents of the Registers 1 through 22 corresponds to 22 samples of a signal. This signal is 4 times the average of the rectified spike waveform.

At the end of each 4 symbol period, that is, at the end of the relevant antenna slot interval, the Z-peak determination circuit 70 and the Z-total determination circuit 72 are each processed once, whereby a 4-bit spike quality value output signal is provided on the output line 80. Thus, in a relevant antenna slot interval, the spike quality value signal is derived once at the end of the interval, based on the 22 register values Z found by integration during 4 symbol periods.

Summarizing, it will be appreciated that, after processing, the contents of the 22 registers 156-1 to 156-22 correspond to 22 samples of a signal. This signal is 4 times the average of a rectified spike waveform. The register with the highest value provides the Z-peak value determined by the Z-peak determination circuit 70. In the Z-total determination circuit 72 the contents of the 22 registers 156 are summed to provide the Z-total value. As is evident from Table 1, the higher Z-peak is, compared to Z-total, the higher is the spike quality value. As will be explained in more detail hereinafter, a carrier ON detection signal is provided by the carrier on/off detection circuit 82 (FIG. 1) at the end of an antenna slot interval when the spike quality value based on these 4 symbols is above a predetermined threshold. If the correlation effected by the correlators 40 and 42 (FIG. 2) provides a good spike waveform during successive symbols, then the Z-peak value is relatively high and the spike quality value will be above the threshold.

Figure 6:
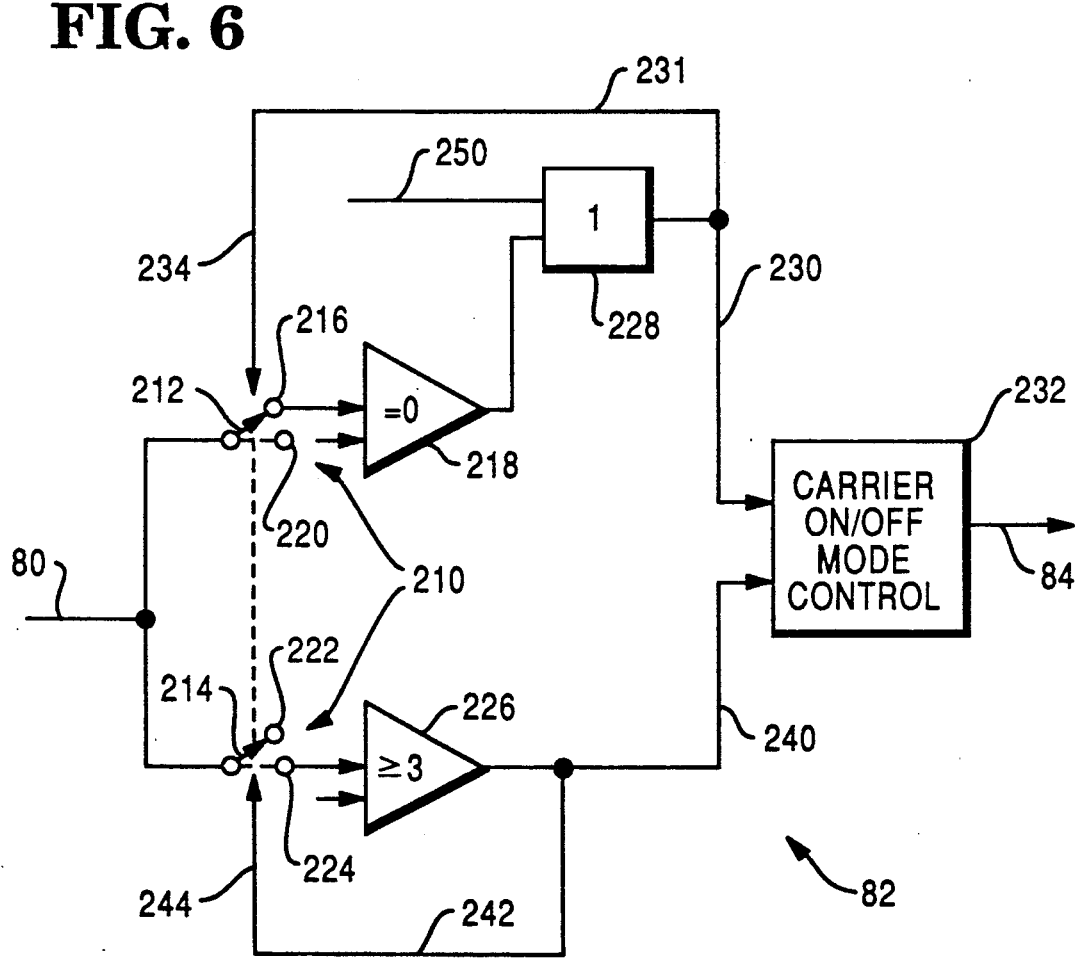
FIG. 6 is a detailed diagram of the carrier on/off detection block shown in FIG. 2.

Referring now to FIG. 6, there is shown an embodiment of the carrier on/off detection circuit 82 (FIG. 1). The spike quality value signal is applied via the line 80 to a switch 210 which has two interconnected switch arms 212 and 214. Of course, in a practical implementation, the switch 210 is an electronic switch. The switch arm 212 contacts either a first terminal 216 which is connected to the input of a comparator 218, or a second terminal 220 which is unconnected. The switch arm 214 contacts either a first terminal 222 which is unconnected, or a second terminal 224, which is connected to an input of a comparator 226. The output of the comparator 218 is connected to an input of an OR gate 228. The output of the OR gate 228 is connected over a line 230 to an input of a carrier on/off mode control circuit 232, and via a line 231 to a control input 234 of the switch 210. The comparator 226 has an output connected over a line 240 to an input of the carrier on/off mode control circuit 232, and over a line 242 to a further control input 244 of the switch 210.

It will be appreciated that the carrier on/off detection circuit 82 has two different thresholds. Initially, the arms 212 and 214 of the switch 210 are in their lower, dashed line positions, contacting the terminals 220 and 224, respectively. If a spike quality value of 3 or more is detached, the comparator 226 is operative to provide an output to the mode control circuit 232 which provides a carrier detect signal on the output line 84. Also, via the line 242, the switch 210 is operated to the position shown wherein the arm 212 contacts the terminal 216, and the arm 214 contacts the terminal 222. If during a transmission, the spike quality becomes 0, then the comparator 218 is operative via the OR gate 228 to provide an input signal to the carrier oh/off mode control circuit 232 indicating that the carrier is no longer present. Of course, this takes place at a time interval after the disappearance of the spike waveform, because of the effect of the integration provided by the leaky integrator circuit 140 (FIG. 5). Normally, at the end of a transmission, a special postamble character is detected and operates the OR gate 228 over a line 250.

It will be appreciated that a very reliable carrier ON detection is achieved under many types of signal impairment, by virtue of the integration over a plurality, 4 in the preferred embodiment, of symbol periods.

Figure 7A:
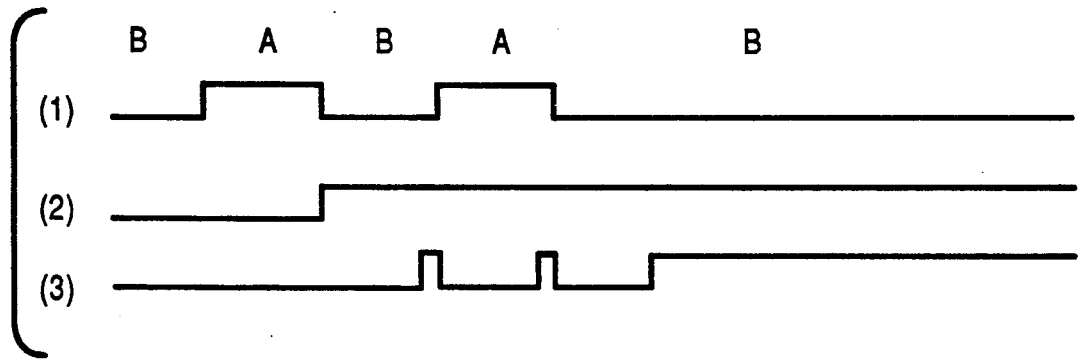
FIG. 7A, 7B, and 7C are waveform diagrams helpful in understanding the operation of the present invention.
Figure 7B:
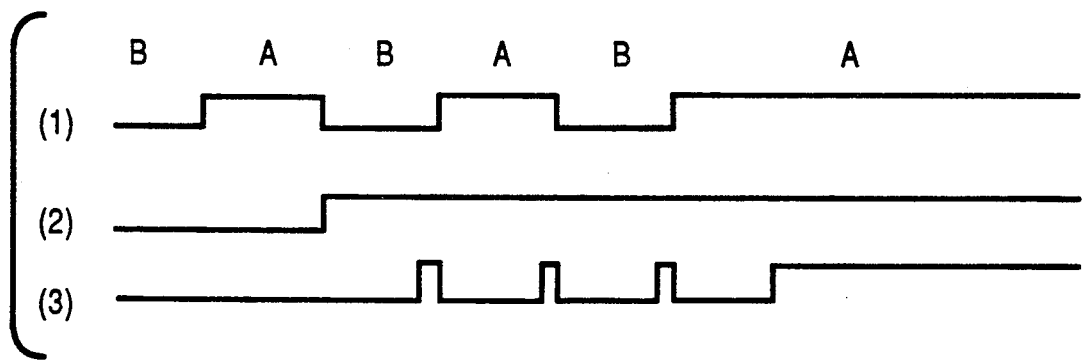
Figure 7C:
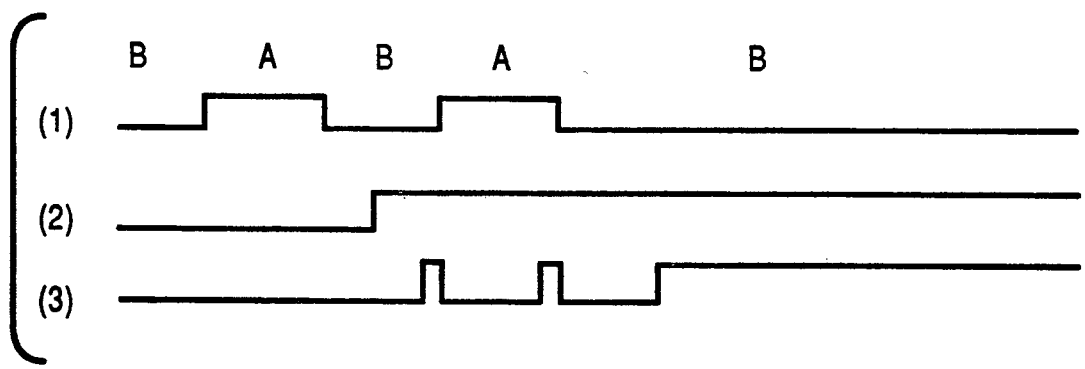

The utilization of the spike quality value for antenna selection will now be described, with reference to FIGS. 7A to 7C, and Table 2. In each of FIGS. 7A to 7C, the first waveform (1) represents the state of the antenna switch 22 (A or B). The second waveform (2) represents carrier activity and the third waveform (3) represents the carrier on/off signal provided by the detection circuit 82 (FIG. 2).

The following Table 2 is a state table for antenna selection control circuit 86, FIG. 2, after carrier detection has taken place.

TABLE 2

| Occurrence of Spike Quality (SQ) values during 2 or 3 antenna slots | Action |
|---|---|
| (a) 1st SQ better than 2nd SQ | switch definitively to 1 SQ antenna |
| (b) 1st SQ worse than 2nd SQ | wait for SQ 3rd slot |
| (b1) 2nd SQ better than 3rd SQ | switch definitively to 2nd SQ antenna |
| (b2) 2nd SQ worse than 3rd SQ | switch definitively to 1st (3rd) SQ antenna |

The utilization of spike quality values for two or three antenna slot intervals guarantees an appropriate selection for all situations. It should be understood that the LAN 10, FIG. 1, has a synchronization provision whereby the sync slot control circuit 94 (FIG. 2) in each station 12 provides for synchronization among the stations by ensuring that the antenna slot intervals are synchronized for all the stations 12. Also, each transmission is controlled to commence at the beginning of an antenna slot. Thus, when a carrier signal is present from the beginning of an antenna slot, the automatic gain control in the receiver stage of the transceiver will be stabilized by the end of that antenna slot, and a clean spike waveform will be provided, such that the spike quality value will be above the threshold (of value 3 in the preferred embodiment) for carrier detection. Referring to Table 2, situation (a), and to FIG. 7A, if the first spike quality value detected is better than the second spike value, the selection control circuit 86 provides for switching to the first antenna. This is illustrated by way of example in FIG. 7A by a switching to state B whereby antenna 16 is utilized for the data reception.

On the other hand, if the first spike quality is worse than the second spike quality, the control circuit 86 waits for the third antenna slot and utilizes the spike quality value thereof for further comparisons, see situation (b) in Table 2. In situation (b1), it is determined that the second spike quality is better than the third spike quality. In this situation, the control circuits 86 causes switching for data reception to the antenna providing the second spike quality value, see FIG. 7B, where there is illustrated switching to state A, corresponding to antenna 14, for data reception. In situation (b2), it is determined that the second spike quality is worse than the third spike quality. There is no further antenna switching, see FIG. 7C, from which it is seen that state B is maintained for data reception.

It will be appreciated that a situation may arise wherein the aforementioned station synchronization has deteriorated, such that a carrier signal arises at the middle of an antenna slot, instead of at the beginning thereof. In this situation, the automatic gain control in the receiver will not be stabilized at the end of an antenna slot. Thus, the first spike quality value detected will refer to the absence of sufficiently good receive condition. However, at subsequent antenna slots appropriate spike quality values will be determined at the end of such slots. In these circumstance, situation (b) in Table 2 is pertinent.

The data frames utilized for data transmission in the preferred embodiment each contain a preamble portion which includes a plurality of training sequence symbols, corresponding to a total duration of five antenna slots. Within the duration of four of these slots, carrier detection and a correct antenna selection are guaranteed by the above-described procedures. The fifth antenna slot interval can then be utilized for the adjustment of other receive functions.

After carrier detection and antenna selection (when alternate switching between states A and B has been terminated), the FIG. 5 circuitry and the timing control circuit 98 are processed for each symbol interval and the contents of the registers 156-1 to 156-22 correspond to 22 samples of a signal waveform. This signal waveform is 32 times the moving average of the rectified spike waveform. If the spike waveform disappears but no postamble character has been received, the spike quality (SQ) becomes zero, which results in carrier OFF detection.

It will be appreciated from the description of the preferred embodiment that the processing of the spike quality is independent of the receive level. Therefore the spike quality will function for a large range of receive levels. The spike quality depends on the quality of the spike waveform received from the ratio of Z-peak and Z-total. The ratio between Z-peak and Z-total is dependent on the relation between signal level and the levels of noise, interference and channel distortion effects. This ratio is thus relevant for the reliability of data transmission. The spike quality value is based on this ratio and is therefore an appropriate reference to select the best antenna. Carrier ON detection is made when a carrier signal is received sufficiently satisfactorily. The spike quality approach ensures for carrier ON detection a high reliability under all kinds of impairments. This reliability is possible by carrier ON detection through the spike quality criterion based on integration during only 4 symbol periods. The reliability of carrier ON detection within 4 symbols after AGC stabilization is important for throughput performance under various impairments. Also, an economy of circuitry is achieved since the integrator and registers circuit 54, FIG. 2, can be additionally employed for timing recovery.

A further advantage of the described embodiment is that two antennas are provided at each station, together with a selection means which selects one of the two antennas at the beginning of the reception of a data frame. This provides an improvement over the application of a single antenna since the probability that both antennas are subject to unacceptable fading or disturbance conditions is very much lower than for a single antenna. The described embodiment provides a fast and reliable antenna selection based on an appropriate quality measurement for the reliability of data transmission which depends on relevant receive conditions such as signal to noise ratio, signal to interference ratio and channel distortion.

Modifications are possible within the scope of the appended claims. Thus, although a spread spectrum code having 11 chips and employing 2 samples per chip has been described, it will be appreciated that a spread spectrum code having a different number of chips and-/or a different number of samples per chip could be employed. Also, forms of modulation could be employed other than the described 4DPSK coding. Thus, for a spread spectrum code with one bit per symbol, only a single correlator need be utilized, having an output connected directly to an integrator and registers circuit, without the need for a coordinate conversion (IQ to polar) block. In another modification, the two antennas may be directed in different orientation directions instead of being polarized in different directions. Furthermore, the wireless transmission link employing a spread spectrum code may utilize transmission frequencies greater than radio frequencies, that is, greater than 3000 GHz. For such frequencies, of course, a type of antenna different from that used for radio frequencies would be employed.

To summarize this invention in claim-like language, it relates to a local area network station for receiving data symbols encoded in a spread spectrum code and transmitted over a wireless channel, comprising:

an analog-to-digital conversion means (36, 38) to provide a digital representation of a received signal;

correlator means (40, 42, 48) coupled to said analog-to-digital conversion means to provide a plurality of signal samples;

integrator and storage means (54) including a plurality of storage registers (156) to store value of integrated representations of said plurality of signal samples;

peak determining means (70) to determine the maximum value stored in said plurality of storage registers;

total value determining means (72) to determine the total value of the values stored in said plurality of storage registers;

spike quality determining means (78) to provide a quality value signal representative of the quality of said received signal, with said quality being dependent upon said maximum value and said total value; and carrier detection means (82) responsive to said quality value signal to provide a carrier detect signal.

The spike quality determining means (78) includes a look-up table addressable by address signals dependent on said maximum value and said total value.

The correlator means (40, 42, 48) includes:

first and second correlators (40, 42) having outputs corresponding to in-phase and quadrature component signals, respectively; and conversion means (48) coupled to the outputs of said first and second correlators to convert the outputs therefrom to an amplitude signal representation and an amplitude signal representation, with said amplitude signal representation applied to said integrator and storage register means (54).

The integrator and storage register means (54) includes a leaky integrator (140) to receive said plurality of signal samples, with said leaky integrator being coupled to said plurality of storage registers (156).

The carrier detection means (82) includes:
first threshold means (226) to be operated in response to said quality value signal exceeding a first predetermined value; and
second threshold means (218) to be operated in response to said quality value signal equaling a second predetermined value.

The local area network station also comprises:
first and second antennas (14, 16);
switching means (22) to selectively render said first and second antennas operative; and
switching control means (86, 90) to operate said switching means for successive antenna slot intervals.

The first and second antennas have different orientation directions in one embodiment and different polarizations in another embodiment.

The switching control means (86, 90) controls the selection of said first or second antenna (14, 16) in dependence on relative quality value signals provided by said spike quality determining means (78) during successive slot intervals in which said first and second antennas are successively operative.

The spike quality determination means (78) is operative for a predetermined number of symbol periods occurring at the end of an antenna slot interval.

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. A local area network station for receiving data symbols encoded in a spread spectrum code and transmitted over a wireless channel, comprising:
    an analog-to-digital conversion means to provide a digital representation of a received signal;
    correlator means coupled to said analog-to-digital conversion means to provide a plurality of signal samples;
    integrator and storage means including a plurality of storage registers to store values of integrated representations of said plurality of signal samples;
    peak determining means to determine the maximum value stored in said plurality of storage registers;
    total value determining means to determine the total value of the values stored in said plurality of storage registers;
    spike quality determining means to provide a quality value signal representative of the quality of said received signal, with said quality being dependent upon said maximum value and said total value; and
    carrier detection means responsive to said quality value signal to provide a carrier detect signal.

2. The local area network station as claimed in claim 1 in which said spike quality determining means includes a look-up table addressable by address signals dependent on said maximum value and said total value.

3. The local area network station as claimed in claim 1 in which said correlator means includes:
    first and second correlators having outputs corresponding to in-phase and quadrature component signals, respectively; and
    conversion means coupled to the outputs of said first and second correlators to convert the outputs therefrom to an amplitude signal representation and a phase signal representation, with said amplitude signal representation applied to said integrator and storage register means.

4. The local area network station as claimed in claim 3 in which said integrator and storage register means includes a leaky integrator to receive said plurality of signal samples, with said leaky integrator being coupled to said plurality of storage registers.

5. The local area network station as claimed in claim 3 in which said carrier detection means includes:
    first threshold means to be operated in response to said quality value signal exceeding a first predetermined value; and
    second threshold means to be operated in response to said quality value signal equaling a second predetermined value.

6. The local area network station as claimed in claim 5 in which said station further comprises:
    first and second antennas;
    switching means to selectively render said first and second antennas operative; and
    switching control means to operate said switching means for successive antenna slot intervals.

7. The local area network station as claimed in claim 6 in which said first and second antennas have different polarization directions.

8. The local area network station as claimed in claim 6 in which said first and second antennas have different orientation directions.

9. The local area network station as claimed in claim 7 in which said switching control means controls the selection of said first or second antenna in dependence on relative quality value signals provided by said spike quality determining means during successive slot intervals in which said first and second antennas are successively operative.

10. The local area network station as claimed in claim 8 in which said switching control means controls the selection of said first or second antenna in dependence on relative quality value signals provided by said spike quality determining means during successive slot intervals in which said first and second antennas are successively operative.

11. The local area network station as claimed in claim 6 in which said spike quality determination means is operative for a predetermined number of symbol periods occurring at the end of an antenna slot interval.

12. In apparatus for receiving a signal representing data symbols encoded in a spread spectrum code, and transmitted over a wireless communication channel, a method for processing the received signal, including the steps of:
    (a) converting the received signal to a digital representation;
    (b) correlating said digital representation to provide a plurality of signal samples;

averaging said signal samples;
- (d) determining a peak value and a total value for the averaged signal samples; and
- (e) determining a spike quality value based on said peak value and said total value.

13. In apparatus for receiving data symbols encoded in a spread spectrum code, and transmitted using a carrier signal on a wireless communication channel, a method for carrier signal detection, including the steps of:
- (a) converting the received signal to a digital representation;
- (b) correlating said digital representation to provide a plurality of signal samples;
- (c) averaging said signal samples;
- (d) determining a peak value and a total value for the averaged signal samples;
- (e) determining a spike quality value based on said peak value and said total value; and
- (f) utilizing said spike quality value to detect the reception of said carrier signal.

14. A method of operating apparatus for receiving a signal representing data symbols encoded in a spread spectrum code, and transmitted over a wireless communication channel, said apparatus including a plurality of antennas, including the steps of:
- (a) converting the received signal to a digital representation;
- (b) correlating said digital representation to provide a plurality of signal samples;
- (c) averaging said signal samples;
- (d) determining a peak value and a total value for the averaged signal samples;
- (e) determining a spike quality value based on said peak value and said total value; and
- (f) utilizing said spike quality value to select one of said plurality of antennas for signal reception.

* * * * *

UNITED STATES PATENT AND TRADEMARK OFFICE
CERTIFICATE OF CORRECTION

PATENT NO. : 5,131,006

DATED : July 14, 1992

INVENTOR(S) : Kamerman et al.

It is certified that error appears in the above-identified patent and that said Letters Patent is hereby corrected as shown below:

Column 13, line 1, before "averaging" insert --(c)--.

Signed and Sealed this

Seventh Day of September, 1993

Attest:

BRUCE LEHMAN

*Attesting Officer*  *Commissioner of Patents and Trademarks*